Sept. 29, 1964 P. H. ROSEN 3,150,634
INSTRUMENT CONTROL DIAL ASSEMBLY
Filed Nov. 15, 1962
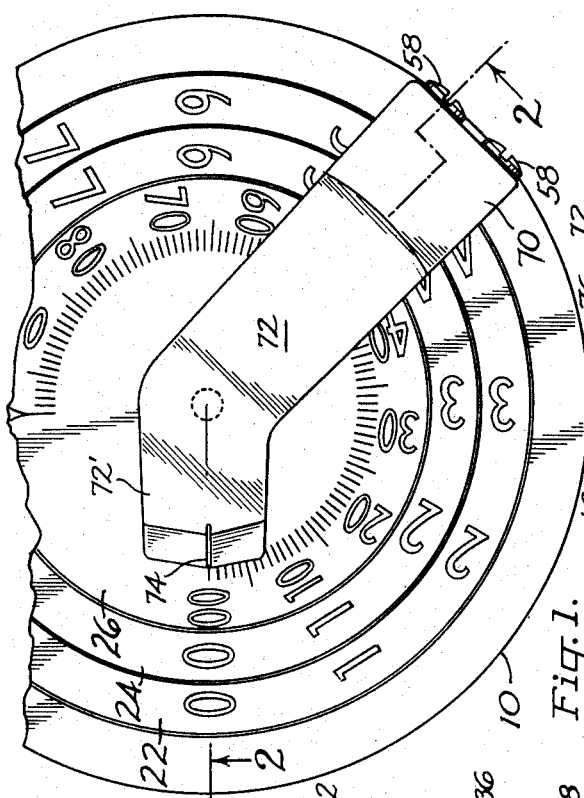
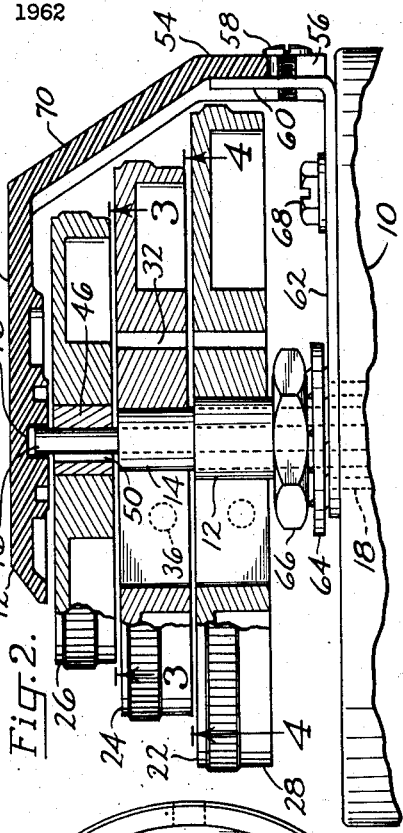
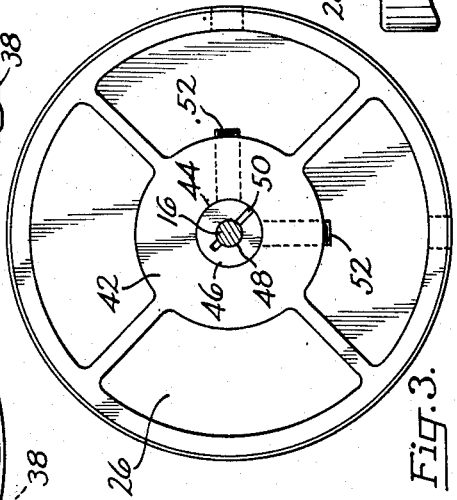
Perry H. Rosen
INVENTOR.
BY
Agent

United States Patent Office 3,150,634
Patented Sept. 29, 1964

3,150,634
INSTRUMENT CONTROL DIAL ASSEMBLY
Perry H. Rosen, Portland, Oreg., assignor to Electro Scientific Industries, Inc., Portland, Oreg., a corporation of Oregon
Filed Nov. 15, 1962, Ser. No. 237,875
5 Claims. (Cl. 116—124)

This invention relates to instrument control dials, and more particularly to a novel construction of an instrument control dial and indicator assembly.

It is the principal object of the present invention to provide an instrument control dial and indicator assembly in which the indicator and associated dial are interconnected against relative displacement to insure maximum precision of dial read-out.

Another important object of this invention is the provision of an instrument dial and indicator assembly in which novel means is provided for clamping the dials to the associated shafts.

A further important object of the present invention is to provide an instrument dial and indicator assembly which is of simplified construction for economical manufacture and which is capable of assembly and disassembly with maximum speed and facility.

The foregoing and other objects and advantages of the present invention will appear from the following detailed description, taken in connection with the accompanying drawing in which:

FIG. 1 is a fragmentary plan view of an instrument dial and indicator assembly embodying the features of the present invention;

FIG. 2 is a fragmentary sectional view taken along the line 2—2 in FIG. 1;

FIG. 3 is a sectional view taken along the line 3—3 in FIG. 2;

FIG. 4 is a sectional view taken along the line 4—4 in FIG. 2; and

FIG. 5 is a fragmentary sectional view taken along the line 5—5 in FIG. 4.

The dial and indicator assembly illustrated in the drawing is shown in association with a housing 10 for an electrical instrument, such as a voltage divider, in which a plurality of adjustable components are controlled individually by associated ones of the concentric rotary shafts 12, 14 and 16. Although three concentric shafts are illustrated, it will be understood that fewer or more may be employed in an instrument. The outermost shaft 12 is journaled for rotation in the bearing 18 extending through the end wall of the housing.

Illustrative of the foregoing construction is the voltage divider disclosed in U.S. Letters Patent No. 2,707,222.

Each of the control shafts releasably supports a control dial 22, 24 and 26, respectively. The dials are progressively smaller in diameter, from the outer shaft 12 to the inner shaft 16, thereby providing an exposed annular area on each dial face for the display for dial markings.

The dials 22 and 24 associated with the outer shafts 12 and 14 are of similar construction, and preferably of the construction of dial 24 illustrated in FIGS. 4 and 5. The dial is cast, preferably of metal, and is provided with an annular rim 28 which extends inward toward the instrument housing 10. A thickened portion of the dial inward of the rim is provided with an axial bore 30 at the center of the dial for receiving the associated control shaft 14. One leg of a substantially U-shaped slot 32 communicates with this bore, and the opposite end of the slot preferably curves arcuately around the bore, a spaced distance therefrom. The slot extends completely through the dial and defines between the legs thereof and a portion of the central bore 30 a clamping member 34. A clamp screw 36 is mounted in a threaded opening in the adjacent thickened central portion of the dial for abutment at its inner end against the outer side of the clamping member, i.e. against the side opposite the central bore 30. The outer end of the clamp screw is provided with a screw driver slot or Allen socket for manipulation by an appropriate tool which may be inserted through an aligned opening 38 in the dial rim. Thus, by rotating the clamp screw inward the clamping member 34 is moved to constrict the central bore 30 and clamp the dial 24 firmly to its associated control shaft 14.

Since it is desirable that the roughly cast central bore 30 in the dial be reamed to precise dimension, means is provided for securing the clamping member 34 initially against deflection, to accommodate said reaming. In the embodiment illustrated, this is provided by the web 40 which is provided during the casting of the dial and which spans the slot 32 preferably in the area adjacent the position of the clamp screw. After the web has served its purpose of maintaining the clamp member rigid during reaming of the bore, it is broken free by tightening the clamp screw 36.

Alternatively, in lieu of the web 40, the clamping member 34 may be held rigid during reaming of the bore simply by bringing the clamp screw 36 into abutment with the clamping member.

The outermost dial 26, associated with the innermost shaft 16, may be constructed in the same manner as the inner dials. However, since the U-shaped slot 32 might be exposed to view and thus detract from the appearance of the dial assembly, it is preferred that the outer dial be constructed in the manner illustrated in FIG. 3. The central thickened portion 42 of the dial is provided with an axial bore 44 which frictionally receives the split clamping ring 46. The ring is provided with an axial bore 48 for receiving the innermost shaft 16, and the radial slot 50 in the ring communicates with said bore. The central thickened portion of the dial is provided with one or more threaded openings for the reception of a clamp screw 52. In the embodiment illustrated, two such clamp screws are provided, and their inner ends are arranged to engage the clamping ring 46 on the opposite sides of the radial slot 50. Thus, by tightening the clamp screws the axial bore 48 in the clamping ring is constricted, thereby securing the dial 26 firmly to the control shaft 16.

An indicator member is associated with the control dials for defining the position of read-out of the latter. In the preferred embodiment illustrated, the indicator member comprises an arm having an end section 54 provided with a pair of spaced slots 56 for removably receiving the anchor screws 58 which are supported in threaded openings in the upward extension 60 of the outer end of the mounting bracket 62. The inner end of the mounting bracket is apertured for mounting on the outwardly projecting end of the bearing 18. A lock washer 64 also is received over this end of the bearing, which end is threaded for the reception of the lock nut 66 by which to secure the mounting bracket to the instrument housing 10. The mounting bracket also is apertured intermediate its ends for the reception of the screw 68 which threads into the instrument housing for securing the mounting bracket against rotation.

An intermediate section 70 of the indicator arm extends forward from the mounting section 54, obliquely toward the axis of the concentric shafts, and supports the front section 72 which extends across the forward end of the shaft 16. The end of this section 72 terminates adjacent the dial markings on the outer dial 26, and is provided with an index mark 74. The portion 72' of this front section which extends beyond the control shaft 16 preferably is offset approximately 45° from the inner section so that, with the index line 74 extending horizontally for read-out of the dials (FIGS. 1), the inner section then extends obliquely downward where it and the sections 54 and 70 fit naturally under the palm of a hand when the fingers engage the dials for manipulation. Thus, manipulation of the dials is afforded most conveniently without in any way obscuring the portions of the dials in the area of the index line.

The front section of the indicator arm is provided on its under side with a socket 76 which receives the projecting end of the innermost control shaft 16. The socket thus forms a pilot bearing for the shaft and the latter, in turn, anchors the indicator arm against displacement relative to the associated dial 26. In this manner relative displacement between the index line 74 and dial markings, which might occur, for example if the shaft 16 were bent, is prevented and maximum accuracy of control dial readout is assured.

In the event that shaft 16 does not extend through dial 26, an axially aligned cylindrical projection may be provided on the dial to seat in the socket 76, to secure the shaft operatively to the arm. Alternatively the shaft or cylindrical extension may be provided with an axial socket and a stub shaft may project from the under side of the arm, in place of the socket 76, for seating therein. In any case the arm is provided with bearing means, such as the socket 76 or the alternative stub shaft, which is spaced outwardly from the instrument housing and operatively confines the projecting portion of the shaft 16 for rotation relative to the arm. Thus, the index line 74 and dial markings are maintained in proper registry regardless of bends or other distortions which might be present in the projecting portion of the shaft 16.

Where the number of concentric shafts require fewer or more dials, the length of the intermediate section 70 of the indicator arm and the radial length of the mounting bracket 62 is decreased or increased correspondingly, as will be understood.

It will be apparent to those skilled in the art that various other changes may be made in the structural details described hereinbefore without departing from the spirit of this invention and the scope of the appended claims.

Having now described my invention and the manner in which it may be used, what I claim as new and desire to secure by Letters Patent is:

1. For use with an instrument having a rotary control shaft projecting outwardly through an instrument housing, a control dial and indicator assembly comprising a dial adapted for mounting on the outward projection of the shaft for rotation therewith a spaced distance outwardly from the housing, the dial having graduation markings disposed thereon concentric with the shaft, an indicator arm adapted for mounting at one end on the instrument housing and projecting outwardly therefrom, the arm having an outer portion spaced outwardly from the instrument housing and extending substantially parallel to the dial and intercepting the axis of the shaft, the arm having index means thereon registering with the graduation markings on the dial, and bearing means on said outer portion of the arm operatively engaging the shaft outwardly of the instrument housing and confining the shaft for rotation relative to the arm, whereby to maintain alignment of the index means and graduation markings regardless of distortions in the projectioning portion of the shaft.

2. The assembly of claim 1 wherein the shaft projects outwardly from the dial, and the bearing means is provided by a socket in the under side of the arm confining the projecting shaft therein.

3. The assembly of claim 1 including a mounting bracket adapted for detachable support on the instrument housing, and connector means releasably securing said one end of the indicator arm to the mounting bracket.

4. The assembly of claim 1 wherein the dial is provided with an axial bore for receiving the control shaft, the dial also having a U-shaped slot therethrough, one leg of which communicates at one end with said bore and extends radially outward therefrom, the other leg of the slot terminating outwardly of the bore on the side of the latter opposite said one leg of the slot, the slot defining a resilient clamping member extending radially outward from the bore, and clamp screw means mounted adjustably on the dial and adapted to engage the clamping member radially outward from the bore for moving the clamping member to constrict said bore, whereby to secure the dial frictionally to the control shaft.

5. For use in an instrument having a rotary control shaft projecting outwardly through an instrument housing, a control dial and indicator assembly comprising a dial adapted for mounting on the outward projection of the shaft for rotation therewith a spaced distance outwardly from the housing, the dial having graduation markings disposed on its outer face concentric with the shaft, an indicator arm adapted for mounting at one end on the instrument housing and projecting outwardly therefrom, the arm having an outer portion spaced outwardly from the instrument housing and extending substantially parallel to the dial across the outer surface thereof and intercepting the axis of the shaft, the outer end of the arm terminating adjacent the graduation markings on the dial, the outer end of the arm having index means thereon registering with the graduation markings on the dial, and bearing means on said outer portion of the arm operatively engaging the shaft and confining the latter for rotation relative to the arm, whereby to maintain alignment of the index means and graduation markings regardless of distortions in the projecting portion of the shaft.

References Cited in the file of this patent

UNITED STATES PATENTS

| | | |
|---|---|---|
| 2,277,699 | Guibert et al. | Mar. 31, 1942 |
| 3,013,339 | Brewer | Dec. 19, 1961 |

FOREIGN PATENTS

| | | |
|---|---|---|
| 18,177 | Germany | May 26, 1882 |